(12) United States Patent
Gantman et al.

(10) Patent No.: US 7,966,497 B2
(45) Date of Patent: Jun. 21, 2011

(54) SYSTEM AND METHOD FOR ACOUSTIC TWO FACTOR AUTHENTICATION

(75) Inventors: Alexander Gantman, San Diego, CA (US); Gregory G. Rose, Concord (AU)

(73) Assignee: Qualcomm Incorporated, San Diego, CA (US)

( * ) Notice: Subject to any disclaimer, the term of this patent is extended or adjusted under 35 U.S.C. 154(b) by 1818 days.

(21) Appl. No.: 10/139,873

(22) Filed: May 6, 2002

(65) Prior Publication Data

US 2003/0159050 A1   Aug. 21, 2003

Related U.S. Application Data

(63) Continuation-in-part of application No. 10/077,365, filed on Feb. 15, 2002, now Pat. No. 7,251,730.

(51) Int. Cl.
*H04L 9/00* (2006.01)
(52) U.S. Cl. ............ 713/184; 380/255; 726/9; 705/65; 705/66; 705/67; 705/71; 705/76; 382/115; 382/116; 382/118; 382/119
(58) Field of Classification Search .......... 713/1, 2, 713/188, 194, 184; 380/255, 277, 200, 201, 380/30, 258, 270; 726/2, 9; 705/66–67, 705/71, 76; 382/115–116, 118–119
See application file for complete search history.

(56) References Cited

U.S. PATENT DOCUMENTS

| 4,305,143 A | 12/1981 | Simms et al. | |
| 4,961,142 A * | 10/1990 | Elliott et al. | 705/73 |
| 5,196,840 A * | 3/1993 | Leith et al. | 340/5.26 |
| 5,200,993 A | 4/1993 | Wheeler et al. | 379/96 |
| 5,422,953 A | 6/1995 | Fischer et al. | |
| 5,481,611 A | 1/1996 | Owens et al. | |
| 5,561,710 A | 10/1996 | Helms | |
| 5,623,637 A | 4/1997 | Jones et al. | |
| 5,696,879 A | 12/1997 | Cline et al. | |
| 5,757,918 A * | 5/1998 | Hopkins | 705/67 |

(Continued)

FOREIGN PATENT DOCUMENTS

CN   1263324   9/2001

(Continued)

OTHER PUBLICATIONS

OA dated Jan. 9, 2009 from Chinese Application Serial No. 03807031.6, 17 pages.

(Continued)

*Primary Examiner* — Joseph Thomas
*Assistant Examiner* — Joseph Pan
(74) *Attorney, Agent, or Firm* — Turocy & Watson, LLP

(57) ABSTRACT

A hand-held token can be operated to generate an acoustic or other wireless signal representing a digital signature produced from the private key of a public key/private key pair, with the public key being confidential in that it is known only to authorized entities, such as bank computers. The signal from the token can be received by, e.g., a receiver at a bank ATM that also requires a PIN for account access. The user enters the PIN into the ATM, and the ATM encrypts the signal from the token with the PIN and sends it on to the bank computer over a link that need not be secure, since even if the PIN is guessed there is no way to verify that it is the correct PIN without also knowing the confidential public key held by the bank computer.

20 Claims, 1 Drawing Sheet

U.S. PATENT DOCUMENTS

| | | | |
|---|---|---|---|
| 5,784,464 | A | 7/1998 | Akiyama et al. |
| 5,953,700 | A | 9/1999 | Kanevsky et al. |
| 5,983,347 | A * | 11/1999 | Brinkmeyer et al. ......... 340/5.62 |
| 6,130,859 | A | 10/2000 | Sonnenschein et al. |
| 6,188,717 | B1 | 2/2001 | Kaiser et al. |
| 6,213,391 | B1 | 4/2001 | Lewis |
| 6,216,231 | B1 | 4/2001 | Stubblebine |
| 6,236,724 | B1 | 5/2001 | Labaton |
| 6,272,176 | B1 | 8/2001 | Srinivasan |
| 6,275,934 | B1 | 8/2001 | Novicov et al. |
| 6,282,522 | B1 * | 8/2001 | Davis et al. ..................... 705/41 |
| 6,297,795 | B1 | 10/2001 | Kato et al. |
| 6,327,314 | B1 | 12/2001 | Cimini et al. |
| 6,343,049 | B1 | 1/2002 | Toda |
| 6,389,055 | B1 | 5/2002 | August et al. |
| 6,397,368 | B1 | 5/2002 | Yonge et al. |
| 6,408,388 | B1 * | 6/2002 | Fischer ......................... 713/176 |
| 6,460,138 | B1 * | 10/2002 | Morris .......................... 713/184 |
| 6,463,537 | B1 | 10/2002 | Tello |
| 6,505,160 | B1 | 1/2003 | Levy et al. |
| 6,553,494 | B1 * | 4/2003 | Glass ............................ 713/186 |
| 6,594,705 | B1 | 7/2003 | Philyaw |
| 6,607,136 | B1 | 8/2003 | Atsmon et al. |
| 6,615,171 | B1 | 9/2003 | Kanevsky et al. |
| 6,768,778 | B1 | 7/2004 | Chen et al. |
| 6,778,828 | B1 * | 8/2004 | Chander et al. ............. 455/435.1 |
| 6,889,209 | B1 | 5/2005 | Rabin et al. |
| 7,093,131 | B1 | 8/2006 | Kobayashi |
| 7,146,500 | B2 | 12/2006 | Hawkins et al. |
| 2001/0021980 | A1 | 9/2001 | Linden et al. |
| 2001/0055352 | A1 | 12/2001 | Bannasch et al. |
| 2002/0095587 | A1 | 7/2002 | Doyle et al. |
| 2002/0114270 | A1 | 8/2002 | Pierzga et al. |
| 2002/0141575 | A1 * | 10/2002 | Hird ............................... 380/44 |
| 2002/0154772 | A1 | 10/2002 | Morishita et al. |
| 2002/0184526 | A1 * | 12/2002 | Bender et al. ................. 713/201 |
| 2002/0191765 | A1 * | 12/2002 | Labaton .................... 379/201.01 |
| 2003/0026197 | A1 | 2/2003 | Crawford |
| 2003/0028770 | A1 | 2/2003 | Litwin .......................... 713/171 |
| 2003/0055892 | A1 * | 3/2003 | Huitema et al. .............. 709/204 |
| 2003/0120925 | A1 | 6/2003 | Rose et al. |
| 2005/0047514 | A1 | 3/2005 | Bolinth et al. |
| 2005/0229009 | A1 | 10/2005 | Fujii et al. |

FOREIGN PATENT DOCUMENTS

| | | |
|---|---|---|
| JP | 7254897 | 3/1995 |
| JP | 11289324 | 10/1999 |
| JP | 2000-224156 | 8/2000 |
| JP | 2001-7802 | 1/2001 |
| JP | 2001-265217 | 9/2001 |
| JP | 2001-309159 | 11/2001 |
| JP | 2003-500957 A | 1/2003 |
| JP | 2005-518721 A | 6/2005 |
| JP | 2006-528391 A | 12/2006 |
| WO | 9724857 | 7/1997 |
| WO | 9731437 | 8/1997 |
| WO | 9813971 | 4/1998 |
| WO | 9825220 | 6/1998 |
| WO | 0021020 | 4/2000 |
| WO | 0110071 | 2/2001 |
| WO | 0111575 | 2/2001 |
| WO | 016140 | 8/2001 |
| WO | 0158080 | 8/2001 |
| WO | 0205078 | 1/2002 |
| WO | 0213455 | 2/2002 |
| WO | 0219590 | 3/2002 |

OTHER PUBLICATIONS

European OA dated Sep. 21, 2006 for EP Application Serial No. 03 716 025.6-2221, 6 pages.
Japanese OA dated Jun. 16, 2009 for JP Application Serial No. 2003-570546, 5 pages.
Gerasimov, et al., Things that talk: Using sound . . . /IBM Systems Journal, vol. 39, Nos. 384, 2000, 17 pages.
European Search Report dated Jun. 6, 2006 for EP Application Serial No. 02798566, 6 pages.
International Search Report dated Apr. 10, 2003 for PCT Application Serial No. PCT/US02/40972, 1 page.
European Search Report dated Sep. 22, 2005 for EP Application Serial No. 03742418.1, 3 pages.
Miyoshi, Preliminary Design of OFDM and CDMA . . . /IEEE Explore Jan. 23, 2009, 4 pages.
International Search Report dated Sep. 5, 2003 for PCT Application Serial No. PCT/US03/20921, 2 pages.
OA mailed Apr. 29, 2008 for CN Patent Application Serial No. 02828136.5, 8 pages.
OA mailed Sep. 19, 2008 for CN Patent Application Serial No. 02828136.5, 7 pages.
OA mailed Jan. 9, 2009 for CN Patent Application Serial No. 02828136.5, 3 pages.
OA mailed May 1, l2009 for CN Patent Application Serial No. 02828136.5, 8 pages.
OA mailed Feb. 18, 2009 for EP Patent Application Serial No. 03742418.1, 6 pages.
OA mailed Apr. 16, 2007 for AU Patent Application Serial No. 2003219752, 1 page.
European Search Report dated Sep. 22, 2005 for EP Application Serial No. 03742418.1, 2 pages.
OA mailed Nov. 9, 2007 for CN Patent Application Serial No. 03807031.6, 4 pages.
OA mailed Jul. 11, 2008 for CN Patent Application Serial No. 03807031.6, 3 pages.
OA mailed Jan. 9, 2009 for CN Patent Application Serial No. 03807031.6, 10 pages.
OA mailed May 20, 2009 for EP Patent Application Serial No. 03716025.6, 7 pages.
OA mailed Jul. 1, 2009 for IL Patent Application Serial No. 163527, 4 pages.
OA mailed May 1, 2009 for IN Patent Application Serial No. 1801/CHENP/2004, 2 pages.
OA mailed Apr. 6, 2008 for IN Patent Application Serial No. 244/CHENP/2006, 2 pages.
OA mailed Jul. 10, 2009 for CN Patent Application Serial No. 200480021026.9, 10 pages.
OA mailed Jun. 23, 2008 for MX Patent Application Serial No. PZ/a/2006/000801, 2 pages.
OA mailed Dec. 24, 2007 for SG Patent Application Serial No. 200600213-3, 5 pages.
OA mailed May 6, 2009 for Chilean Patent Application Serial No. 0283-2003, 4 pages.
OA dated Aug. 14, 2009 for Chinese Patent Application Serial No. 02828136.5, 3 pages.
OA dated Oct. 15, 2009 for Chinese Patent Application Serial No. 03807031.6, 11 pages.
OA dated Aug. 21, 2009 for European Patent Application Serial No. 03742418.1, 4 pages.
OA dated Jun. 23, 2009 for European Patent Application Serial No. 03742418.1, 5 pages.
OA dated Nov. 4, 2009 for European Patent Application No. Serial No. 02798566.2, 26 pages.
OA dated Jul. 22, 2009 for European Patent Application Serial No. 02798566.2, 8 pages.
OA dated May 1, 2009 for Indian Patent Application Serial No. 1801/CHENP/2004-KM, 2 pages.
OA mailed Apr. 2, 2009 for Japanese Patent Application Serial No. 2003-557137, 9 pages.
OA mailed Jun. 16, 2009 for Japanese Patent Application Serial No. 2003-570546, 5 pages.
OA dated Sep. 30, 2009 for Korean Patent Application Serial No. 10-2004-7009836, 3 pages.
Chilean Office Action mailed Sep. 3, 2010 for CL Application Serial No. 0283-03, 6 pages.
OA dated Jun. 3, 2010 for Canadian Patent Application Serial No. 2476485, 3 pages.
OA dated Jul. 16, 2010 for Colombian Patent Application Serial No. 04090727, 2 pages.
OA dated Jun. 17, 2010 for Australian Patent Application Serial No. 2004262288, 3 pages.

Japanese OA dated Aug. 10, 2010 for JP Patent Application No. 2006-521236, 3 pages.
Chinese OA dated Jan. 10, 2011 for CN Patent Application No. 200480021026.9, 7 pages.

Korean OA dated Jan. 18, 2011 for KR Patent Application No. 2006-7001477, 3 pages.

* cited by examiner

SYSTEM AND METHOD FOR ACOUSTIC TWO FACTOR AUTHENTICATION

RELATED APPLICATIONS

This application is a continuation-in-part of U.S. patent application Ser. No. 10/077,365, filed Feb. 15, 2002, now U.S. Pat. No. 7,251,730 for an invention entitled "Method and Apparatus for Simplified Audio Authentication", and is related to co-pending U.S. patent application Ser. No. 09/611, 569, filed Jul. 7, 2000, for an invention entitled "Method and Apparatus for Simplified Audio Authentication", both of which are incorporated herein by reference.

I. FIELD OF THE INVENTION

The present invention relates generally to authentication using audio tones.

II. BACKGROUND OF THE INVENTION

As Internet use has grown, many types of convenient electronic commerce have been made possible, such as, for example, buying goods and services online, banking online, and using automatic teller machines (ATM) that are linked to remote banks. But the very convenience of electronic commerce has made it easier for thieves to steal valuable information and/or to pose as someone they are not to purchase goods, withdraw money from bank accounts, and so on.

Accordingly, affording security in electronic transactions is crucial. To this end, many electronic transactions are encrypted, to conceal private information being exchanged. But encryption is only one aspect of security, since it is possible for a thief to break the encryption or to come into possession of an otherwise valid item such as a credit card, pose as the owner, and participate in an encrypted transaction.

With this in mind, it readily may be appreciated that authentication is an important aspect of security. In terms of electronic commerce, the person seeking authentication does so through a computer interface. Consequently, it normally is not feasible to resort to checking a biological feature of the person (appearance, handwritten signature, fingerprint, and so on) to verify that the person is who he says he is, absent the widespread installation of an infrastructure of bio-sensing computer accessories.

This leaves two authentication factors available, namely, authenticating a person based on something the person has, such as a credit card or key fob, or based on something the person knows, such as a password or personal identification number (PIN). For some particularly sensitive applications such as ATM money withdrawals, both factors might be desirable.

Currently, a user of an ATM engages an authentication device such as a credit card with the ATM, and then inputs a PIN. In this way, two factor authentication is achieved. However, the ATM must transmit both the secret information on the card and the PIN to a central bank computer for authentication. Consequently, the link between the bank and the ATM must be secure to prevent a thief from eavesdropping on the line and discovering both authentication factors, which otherwise could enable the thief to steal money from the user's account. This places a considerable burden on the link infrastructure.

The above-identified patent applications disclose hand-held sonic-based "tokens" that a person can manipulate to transmit an acoustic signal representing secret information to a device, referred to as an "authenticator", "verifier", or "receiver", to authenticate the person based on the signal. As recognized in those applications, the advantage of sonic-based tokens is that a large installed infrastructure already exists to receive and transmit sound and electronic signals derived from sound. Specifically, the global telephone system exists to transmit data representative of acoustic information, and apart from telephones many computing devices that are now linked by this same system (as embodied in the Internet) have microphones and speakers (or can easily be modified to have them).

As recognized herein, when used in the context of ATMs, sonic tokens have the advantage of transmitting the private information on the token to the ATM in a fashion that prevents the ATM from being able to forge the private information without a confidential key. The ATM simply sends the private information to the central bank computer for authentication. Thus, neither the ATM nor the link between the ATM and the bank need be secure to protect this authentication factor. However, the present invention further recognizes that the second authentication factor—the PIN—still requires link security. This is because PINs generally consist of only 4-6 digits, and an attacker could snoop the line between the ATM and bank, and if the communication allowed a guessed PIN to be verified, the attacker could simply try out the million or so possible PIN values and remember the one that worked until such time as the attacker could steal the token and gain access to the account. Consequently, secure communication between the bank and ATM, unfortunately, would still be required.

Having recognized the above problem, the invention disclosed herein is provided.

SUMMARY OF THE INVENTION

A method for authentication includes initially providing a PIN and a confidential public key to an authorizing computer, e.g., a bank computer, and establishing a communication link between the authorizing computer and a receiver, e.g., an ATM, that is remote from the computer. The communication link is not constrained to be secure. Subsequently, a user's acoustic signal can be received at the receiver (e.g., ATM), with the signal being representative of a private key-generated digital signature, and with the receiver transforming the acoustic signal to a signature signal. The PIN is also received by the receiver by, e.g., a user typing it in on a data entry device associated with the receiver, so that the PIN is received separately from the acoustic signal. The signature signal is encrypted with the PIN to render an encrypted signature signal, which is then sent to the authorizing computer for verification of the signature using the PIN and confidential public key.

Preferably, the signature signal is encrypted with the PIN by the receiver. The acoustic signal, on the other hand, preferably is transmitted using a hand-held token. A desired transaction can be input to the receiver, with the authorizing computer authorizing the receiver to execute the transaction only if the signature is verified.

The signature is verified by the authorization computer by decrypting the encrypted signature signal using the PIN to render the signature signal. Then, the resulting signature signal is verified using the confidential public key.

In a preferred embodiment, the token generates a signature signal by combining a message with the private key. The message can include at least a portion of a timestamp, e.g., a predetermined number of least significant bits of a timestamp having more bits than the predetermined number.

In another aspect, a system is disclosed for two-factor authentication over a link that is not constrained to be secure. The system includes a portable token that generates a wireless signal representing a digitally signed message. A receiver receives the wireless signal and a PIN, with the PIN being received separately from the wireless signal. The receiver encrypts the signed message with the PIN to render an encrypted signed message. An authorizing computer receives the encrypted signed message over the link and accesses the PIN and a confidential public key to attempt to verify the signed message.

In still another aspect, a system for authentication includes an authorizing computer accessing at least a PIN and a confidential public key and communicating over a link with at least one receiver remote from the computer. The communication link is not constrained to be secure. The system includes means for receiving, at the receiver, a wireless signal that represents a digital signature generated by combining a message with a private key. The receiver transforms the wireless signal to a signature signal. Means at the receiver also receive the PIN. Means are provided for encrypting the signature signal with the PIN to render an encrypted signature signal. The encrypted signature signal is sent to the authorizing computer over the link for verification the signature using the PIN and confidential public key.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
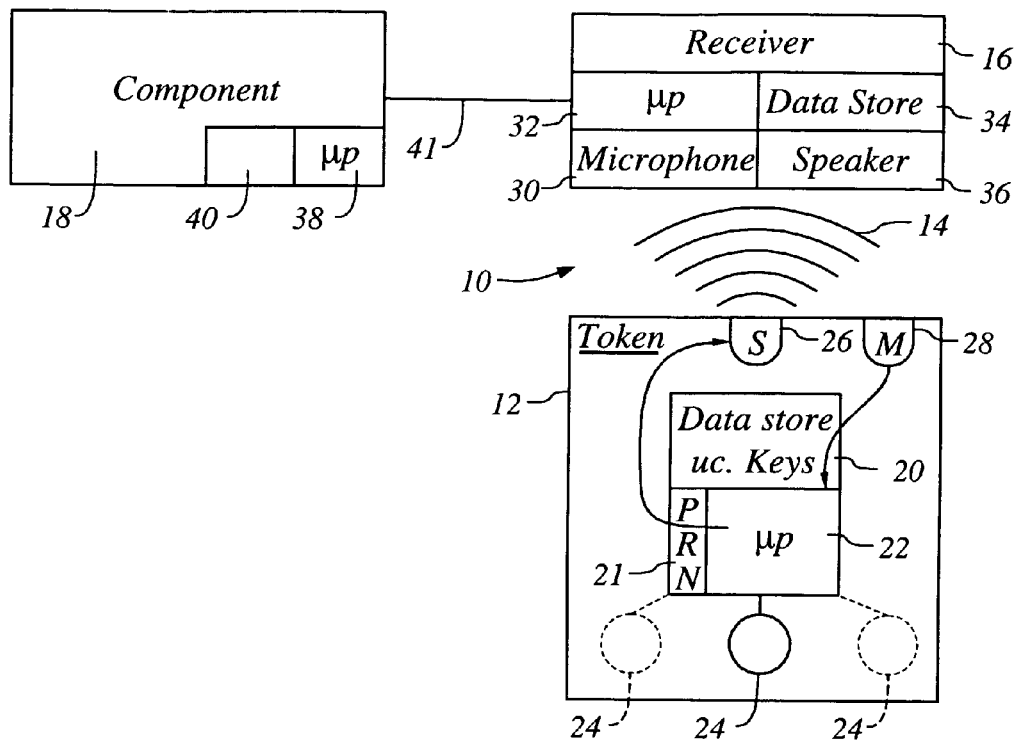
FIG. 1 is a block diagram of the present system for audio-based authentication.

Referring initially to FIG. 1, a system is shown, generally designated 10, that includes a portable hand-held token 12 that can be configured as a key fob or other small device. The present invention, however, applies to other token configurations, such as mobile communication stations including laptop computers, wireless handsets or telephones, data transceivers, or paging and position determination receivers that can be hand-held or portable as in vehicle-mounted (including cars, trucks, boats, planes, trains), as desired. Wireless communication devices are also sometimes referred to as user terminals, mobile stations, mobile units, subscriber units, mobile radios or radiotelephones, wireless units, or simply as "users" and "mobiles" in some communication systems.

In any case, the token 12 can generate an acoustic signal, represented schematically by the lines 14, that can be received by a receiver 16. The receiver 16 is associated with authorizing computer 18. In an illustrative embodiment, the receiver 16 is an automatic teller machine (ATM) and the authorizing computer 18 is a bank main computer, although it is to be understood that the receiver 16 may be a receiving device associated with, e.g., a building, a home, a vehicle, or any other component to which it is desired to limit access to pre-authorized users using two factor authentication. It is to be further understood that while the preferred token 12 is a sonic token that generates an acoustic signal, the present principles apply to other wireless signal-generating tokens including those that might use electromagnetic wave wireless communication principles, e.g., radiofrequency (rf) such as Bluetooth and infrared, to transmit the below-disclosed digital signature to the receiver 16.

The preferred acoustic signal 14 can represent a digital signature that is generated using a private key stored in an electronic data store 20 of the token 12. A pseudorandom number (PN) generator 21 can also be included on the token 12. Corresponding confidential public keys or confidential public key identifications can also be stored therein for purposes to be shortly disclosed.

In accordance with private key/public key principles known in the art and set forth in, e.g., the National Institute for Standards and Technology (NIST) Federal Information Processing Standards Publication 186-2, January, 2000, the signature algorithm in the token 12 (executed by a microprocessor 22 within the token 12) receives as input (and thus "combines") the private key and at least a portion of the message to be signed and with a random number "k" from the PN generator 21 to render a digital signature which is a random pair (r,s). Preferably, the microprocessor 22 executes the signature algorithm upon receipt of activation signals from, e.g., one or more activation elements 24 such as toggle switches, voice activation devices, or pushbuttons. The message being signed and the identity of the confidential public key corresponding to the private key also are preferably included in the signal generated by the microprocessor 22. It is to be understood that the microprocessor 22 can include a digital processor proper as well as necessary clocks, analog to digital conversion circuitry, and digital to analog conversion circuitry known in the art.

The microprocessor 22 accesses the data store 20, such that when multiple activation elements 24 are used, one or more can be associated with a respective private key in the store 22. The electronic signature signals are sent to an audio speaker 26 for transformation of the electronic signature signal to the acoustic signal 14. The acoustic signal may or may not be audible. If desired, a microphone 28 can also be provided on the token 12 to receive acoustic signals and transform them to electronic signals, which are sent to the microprocessor 22 for processing. When EM wave wireless principles are used, the speaker 26 is replaced by, e.g., an rf transmitter or IR transmitter.

The preferred acoustic signal 14 is received by a microphone or other acoustic receiving device 30 at the receiver 16. The acoustic signal is transformed by the microphone 20 back to an electronic signature signal (with accompanying confidential public key ID and original pre-signed message, if desired) and sent to a microprocessor 32, which may access a data store 34 if desirable. If desired, a speaker 36 can also be provided on the receiver 16 to send acoustic signals back to the token 12, which signals are received by the microphone 28 on the token 12.

When the receiver 16 is an ATM and the authorizing computer 18 is a central bank computer, the authorizing computer 18 can include a processor 38 that accesses a data store 40 to selectively grant authorization by verifying (or not) the digital signature received from the receiver 16. The data store 40 can include a data structure such as a list or database table which stores the confidential public key (and its ID) that is associated with the private key represented by the signal. In any case, the link 41 connecting the bank with the ATM need not be secure, owing to the novel use of cryptography disclosed below.

Figure 2:
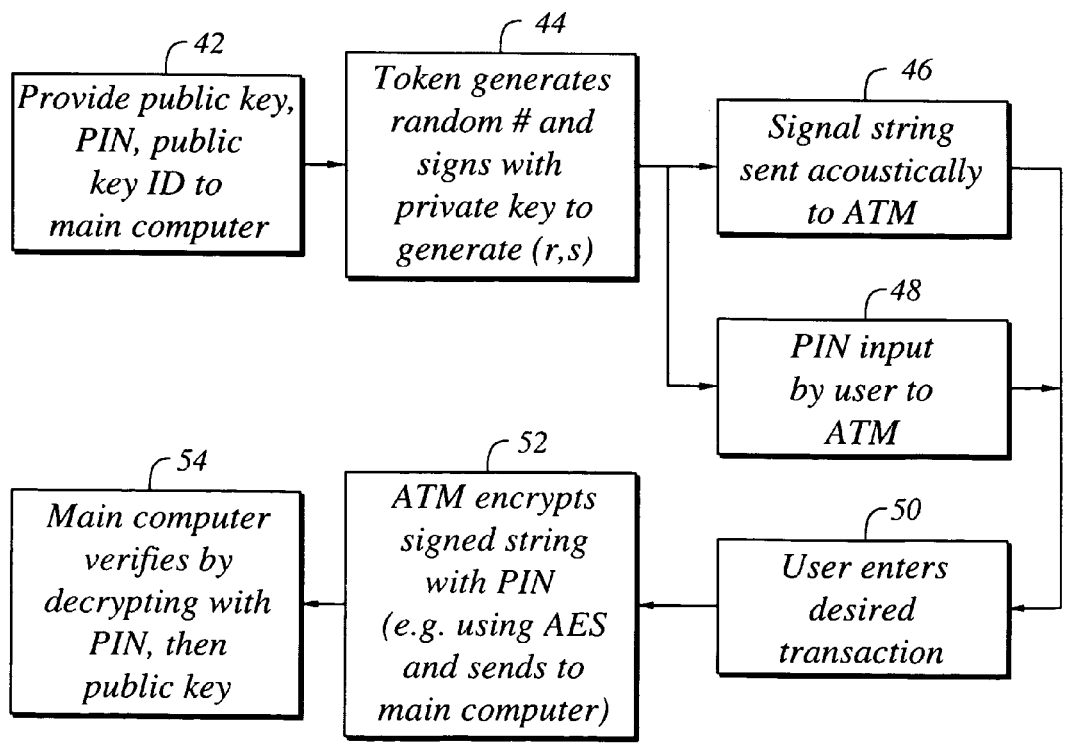
FIG. 2 is a flow chart of the present logic.

FIG. 2 shows the logic of the present invention. Commencing at block 42, the confidential public key(s) associated with the token 12, along with the IDs of the public keys, are provided to the authorizing computer 18 (e.g., main bank computer). Also, the user's PIN is provided. This provision is done securely, either in person or over a secure connection. By "confidential public key" is meant a public key in accordance with private key/public key principles known in the art, except that the confidential public key is not publicly accessible, but rather is provided only to trusted entities, such as a main bank computer.

Moving to block 44, when a user manipulates one of the activation elements 24 the signature algorithm in the token 12 receives as input the private key, a pseudorandom number, and a message, such as all or a portion of a timestamp, to generate an electronic signature, e.g., a random pair (r,s). The user then inputs both factors of authentication into the receiver 16. Specifically, at block 46 the digital signature is wirelessly (e.g., acoustically) sent to the receiver 16, along with the message that was signed and if desired the ID of the corresponding confidential public key, and at block 48 the user inputs the PIN using, e.g., the numeric keypad that is provided on most ATMs. The desired transaction (e.g., withdrawal, funds transfer, etc.) is entered at block 50. It is to be understood that the steps at blocks 46, 48, and 50 can be executed in any order.

In accordance with the present invention, at block 52 the receiver 16 encrypts the signature (r,s) with the PIN. This encryption can be a symmetric encryption using, e.g., AES encryption principles. The encrypted signature, along with the unencrypted confidential public key ID and unencrypted pre-signed message being signed (e.g., a timestamp or least two significant bits thereof) are sent to the main computer processor 38.

At block 54, the main processor 38 first decrypts the digital signature using the PIN. Then, using the confidential public key ID and original pre-signed message, the processor retrieves from the data store 40 the appropriate confidential public key and verifies the signature in accordance with public key/private key principles known in the art. If verification is successful, the authorizing computer 18 signals the receiver 16 to allow access. In the case of an ATM verifier 16 and bank computer authorizing computer 18, the bank computer signals the ATM to execute the requested transaction.

It may now be appreciated that an attacker who might intercept ATM-bank communications on the link 41 could not deduce the PIN. Specifically, decrypting the signature using the "correct" PIN will yield the equivalent of decrypting it using an incorrect PIN, i.e., a random pair that can't be understood without verifying the signature, something that cannot be done without the confidential public key and the data being signed (note that only the least significant bits of the timestamp are transmitted). This feature removes the final requirement for security on the link 41.

While the particular SYSTEM AND METHOD FOR ACOUSTIC TWO FACTOR AUTHENTICATION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

What is claimed is:

1. A method for authentication, comprising:
receiving an acoustic signal at a receiver transmitted from a hand-held token, the acoustic signal represents a signature signal generated by the hand-held token utilizing a private key;
receiving a user inputted personal identification number (PIN) at the receiver, including receiving the user inputted PIN separately from the acoustic signal via a data entry device at the receiver and communicating the acoustic signal from the hand-held token to the receiver;
transforming the acoustic signal to the signature signal at the receiver;
encrypting the signature signal with the user inputted PIN at the receiver to render an encrypted signature signal; and
sending the encrypted signature signal from the receiver to an authorizing computer via a communication link to decrypt the encrypted signature signal utilizing a provisioned PIN to render the signature signal and verify the signature signal employing a provisioned confidential public key.

2. The method of claim 1, further comprising:
receiving a request to perform a transaction at the receiver; and
executing the transaction with the receiver only if the encrypted signature signal is successfully decrypted and verified by the authorizing computer.

3. The method of claim 2, further comprising receiving an authorization signal at the receiver from the authorizing computer via the communication link in response to sending the encrypted signature signal, the authorization signal one of authorizes execution of the transaction by the receiver when the encrypted signature signal is successfully decrypted and verified or denies execution of the transaction by the receiver when the encrypted signature signal is unsuccessfully decrypted and verified.

4. The method of claim 1, wherein the hand-held token generates the signature signal by combining at least one message with the private key.

5. The method of claim 3, wherein the at least one message includes at least a portion of at least one timestamp.

6. The method of claim 4, wherein the portion of the timestamp is a predetermined number of least significant bits of a timestamp having more bits than the predetermined number.

7. The method of claim 1, wherein the receiver is an automatic teller machine (ATM) and the authorizing computer is a bank computer.

8. The method of claim 1, wherein the acoustic signal further represents at least one of a confidential public key identifier (ID) or a pre-signed message, the method further comprising:
transforming the acoustic signal to the signature signal and the at least one of the confidential public key ID or the pre-signed message at the receiver; and sending the encrypted signature signal along with the at least one of the confidential public key ID or the pre-signed message from the receiver to the authorizing computer via the communication link, the at least one of the confidential public key ID or the pre-signed message being utilized by the authorizing computer to retrieve the provisioned confidential public key.

9. A system for two-factor authentication over a link not constrained to be secure, comprising:

a receiver that separately receives an acoustic signal generated from a portable token representing a digitally signed message and a user entered personal identification number (PIN), wherein the acoustic signal is communicated from the portable token to the receiver and the user entered PiN is entered via a data entry device at the receiver, the receiver transforms the acoustic signal to the digitally signed message, and encrypts the digitally signed message with the user entered PiN to render an encrypted signed message for transmission over the link, the receiver sends the encrypted signed message to an authorizing computer to decrypt the encrypted signed message with a retained PN to yield the digitally signed message and verify the digitally signed message with a retained confidential public key.

10. The system of claim 9, wherein the acoustic signal also represents at least an identifier (ID) of a confidential public key and a message that was signed by a private key corresponding to the retained confidential public key to render the digitally signed message.

11. The system of claim 10, wherein the receiver sends the encrypted signed message, the ID, and the message that was signed to the authorizing computer.

12. The system of claim 10, wherein the authorizing computer decrypts the encrypted signed message using the retained PIN and then verifies the digitally signed message by retrieving the retained confidential public key corresponding to the ID and using the retrieved, retained confidential public key.

13. The system of claim 9, wherein the receiver obtains a request to execute a transaction and selectively executes the transaction based upon an authentication signal received from the authorizing computer that indicates one of successful or unsuccessful verification of the digitally signed message.

14. A system for authentication including an authorizing computer that accesses a provisioned personal identification number (PIN) and a provisioned confidential public key and communicates over a link with a receiver remote from the authorizing computer, the communication link not being constrained to be secure, the system comprising:

means for receiving an acoustic signal at the receiver from a hand-held device, the acoustic signal represents a signature signal produced from a private key, the receiver transforms the acoustic signal to a signature signal;

means for receiving a user inputted PIN at the receiver, the user inputted PIN is received separately from the acoustic signal, wherein the user inputted PIN is received via a data entry device at the receiver and the acoustic signal is communicated from the hand-held device to the receiver;

means for encrypting the signature signal with the user inputted PIN at the receiver to render an encrypted signature signal; and means for transmitting the encrypted signature signal from the receiver to the authorizing computer over the link, the authorizing computer decrypts the encrypted signature signal utilizing the provisioned PIN to yield the signature signal and verifies the signature signal using the provisioned confidential public key.

15. The system of claim 14, further comprising means for receiving a request to execute a transaction at the receiver, the authorizing computer authorizing the receiver to execute the transaction only if the signature signal is successfully verified.

16. The system of claim 14, wherein the hand-held device generates the signature signal by combining at least one message with the private key.

17. The system of claim 16, wherein the at least one message includes at least a portion of at least one timestamp.

18. The system of claim 16, wherein the at least one message is further combined with a pseudorandom number.

19. The system of claim 10, wherein the acoustic signal represents the signature signal produced from the private key and one or more of a confidential public key identifier (ID) or a pre-signed message, the one or more of the confidential public key ID or the pre-signed message being utilized by the authorizing computer to identify the provisioned confidential public key.

20. The system of claim 14, wherein the receiver is an automatic teller machine (ATM) and the authorizing computer is a bank computer.

* * * * *